United States Patent [19]
Vallot et al.

[11] Patent Number: 5,610,616
[45] Date of Patent: Mar. 11, 1997

[54] DIFFERENTIAL GPS GROUND STATION SYSTEM

[75] Inventors: Lawrence C. Vallot, Shoreview; Mats A. Brenner, Plymouth, both of Minn.

[73] Assignee: Honeywell Inc., Minneapolis, Minn.

[21] Appl. No.: 643,495

[22] Filed: May 6, 1996

Related U.S. Application Data

[63] Continuation of Ser. No. 294,284, Aug. 23, 1994, abandoned.

[51] Int. Cl.$^6$ .............................. H04B 7/185; G01S 5/02; G01C 21/00; G06F 7/70
[52] U.S. Cl. ...................... 342/357; 364/424.06; 340/979
[58] Field of Search ................................... 342/357, 352; 364/424.06; 340/979

[56] References Cited

U.S. PATENT DOCUMENTS

| | | | |
|---|---|---|---|
| 4,894,655 | 1/1990 | Joguet et al. | 342/357 |
| 5,155,490 | 10/1992 | Spradley et al. | 342/357 |
| 5,323,322 | 6/1994 | Mueller et al. | 364/449 |
| 5,430,654 | 7/1995 | Kyrtsos et al. | 364/449 |
| 5,477,458 | 12/1995 | Loomis | 364/449 |

FOREIGN PATENT DOCUMENTS 9410582  5/1994  WIPO.

OTHER PUBLICATIONS

Kee et al, "Wide Area Differential GPS", Ion, Sep. 1990.
"The ARINC Veracious Differential Reference Station Concept and Status" by Kovach et al, pp. 143–152 from the Conference Proceedings, National Telesystems Conference 1993.
"Design and Flight Test of a Differential GPS/Inertial Navigation System for Approach/Landing Guidance" by L. Vallot, S. Snyder, B. Schipper, N. Parker, and C. Spitzer.

*Primary Examiner*—Gregory C. Issing
*Attorney, Agent, or Firm*—Charles J. Ungemach

[57] ABSTRACT

A differential satellite positioning system is configured to include a plurality of satellite positioning system receivers in spatial proximity of one another for determining independent pseudo range values which are processed in accordance with a selected averaging scheme for determining highly reliable satellite differential corrections.

10 Claims, 6 Drawing Sheets

DIFFERENTIAL GPS GROUND STATION SYSTEM

This application is a continuation, of application Ser. No. 08/294,284 filed Aug. 23, 1994, now abandoned.

BACKGROUND OF THE INVENTION

1. Field of the Invention

The present invention pertains to global positioning systems (GPS), and more specifically, a ground station for determining satellite-specific pseudo range error associated with the satellite signals received by a GPS receiver.

2. Description of the Related Art

Satellite positioning systems, commonly referred to as global positioning systems or simply GPS are now well-known in the art. Such specific systems, for example, NAVSTAR-GPS are rapidly being used for determination of the geocentric position of mobile units, such as water and land vehicles, aircraft and survey equipment, to name a few.

In aircraft, GPS systems are being utilized for navigation, flight control, and air space control. These GPS systems may operate independently, or in combination with, among others, inertial reference systems or attitude heading reference systems in order to provide information during an aircraft flight mission.

Global positioning systems similar to NAVSTAR commonly use a GPS receiver, located on a mobile unit, for receiving satellite information signals transmitted from a plurality of satellites. Each GPS satellite transmits an information signal containing data that allows a user to determine the range or distance between selected GPS satellites and the antenna associated with the mobile unit's GPS receiver. These distances and knowledge of the satellite positions are then used to compute the position of the receiver unit using known triangulation techniques. For example, in the NAVSTAR-GPS system, a mobile unit with a GPS receiver, such as an aircraft, detects a pseudo random code contained in a given GPS satellite information signal and derives therefrom the "elapsed time" or time delay between the transmission of the satellite signal and its reception at the GPS receiver. From this time delay, the GPS receiver derives the range between the GPS receiver antenna and the satellite, sometimes referred to as the pseudo range or pseudo range measurement. Herein, the GPS receiver's position, or the mobile unit's position, generally refers to the corresponding antenna position.

In addition, as part of the NAVSTAR-GPS system, each satellite information signal also contains precise ephemeris data and course almanac data which both describe the corresponding satellite orbital trajectory in earth centered space as is well known in the art. The coordinates of the satellite's orbital position at the receiver measurement time may be derived from either the ephemeris data or the course almanac data. The geocentric position of the satellite may be calculated with a higher degree of precision from the ephemeris data than is possible with the almanac data. However, because the ephemeris data precisely describes the satellite trajectory at the moment of transmission of the satellite information signal, it is only valid for a few hours thereafter, as is well known.

It should be understood that the mobile unit's three-dimensional geocentric position coordinates in the World Geodetic System Coordinate system may be determined using either the ephemeris data or almanac data received from four or more satellites. Herein, it should be recognized by those skilled in the art that the World Geodetic System is an earth-centered, earth-fixed geocentric coordinate system, which may be converted to any other coordinate system as required by the user. Sometimes the aforementioned coordinate system is referred to as the WGS84 earth-centered, earth-fixed, rectangular coordinate frame. Herein, the World Geodetic System Coordinates should be presumed, and position refers to this three dimensional WGS84 coordinate system.

In order to determine the position of the GPS receiver unit, a minimum of four satellite signals are required, rather than the expected three. This is so, since the GPS receiver includes a receiver clock which is not as accurate as the atomic clock of the satellites. Therefore, receiving satellite information signals from four different satellites provides a complete solution which permits the correction of any receiver clock error as is well understood in the art. Herein, the corrected receiver clock time is referred to as the receiver time. Thus, if signals from four or more satellites are available to the GPS receiver unit, the geocentric position of the receiver may be determined within approximately one-hundred meters of its "true" geocentric position. Herein, the receiver position derived by the triangulation technique using data from multiple satellites is referred to as the "estimated position". The accuracy of the estimated position of the receiver unit is dependent upon many factors including, among others, atmospheric conditions, selective availability, and the relative position of the satellites with respect to the line of sight view of the satellites.

Although the satellite positioning system referred to as GPS is by far the most accurate global navigation system ever devised, its incredible accuracy can be boosted using a technique called "differential GPS", sometimes referred to as "DGPS". DGPS can achieve measurement accuracy better than a meter. Differential GPS has been widely used in surveying applications, and now its use is being developed for aircraft approach and landing applications.

With regard to the latter, GPS systems standards have been developed by the Radio Technical Commission for Aeronautics (RTCA) in association with aeronautical organizations of the United States from both government and industry. The RTCA has defined performance requirements for a DGPS system as particularly identified in Document No. RTCA/DO-217, dated Aug. 27, 1993; and for GPS performance requirements for navigation equipment as particularly identified in Document No. RTCA/DO-208, dated Aug. 27, 1993, both of which are incorporated herein by reference thereto.

As is well understood in the art, a differential GPS system incorporates a reference or "ground station" which includes a GPS receiver's antenna installed at a surveyed site. The geocentric position of the GPS receiver is known from surveying techniques. The GPS ground station receiver determines pseudo range values between the receiver and a plurality of satellites. Since the position of the satellite is derived from the satellite data associated with the satellite signals, and the position of the receiver is also known, a calculated range value therebetween may be determined for each of the tracked satellites. In turn, the difference between the pseudo range value and the calculated range value for each of the tracked satellites may be determined. This difference is commonly referred to as the "differential correction". The differential correction value is essentially the pseudo range error between the "observed" or "measured" pseudo range value derived from the satellite signal travel time and the calculated range value between the antenna's position and corresponding satellite position.

The motivation for differential operation is that many of the largest GPS error sources, such as selective availability and ionospheric effects, are common to two or more receivers operating in spatial and temporal proximity, since these anomalies affect the satellite signal travel time. These error sources can be nearly eliminated in the differential mode, namely determining the differential correction value or pseudo range error, to greatly enhancing performance. A differential GPS system is shown and described in a publication entitled, "Design and Flight Test of a Differential GPS/Inertial Navigation System for Approach/Landing Guidance", Navigation: Journal of Institute of Navigation, Summer 1991, Vol. 38, No. 2, pp 103–122, incorporated herein by reference thereto.

As described therein, these differential corrections may be transmitted, by any data link technique, to a mobile unit which incorporates a GPS receiver and associated antenna experiencing substantially the same errors in the pseudo range observed values for the same tracked satellites as the ground station receiver. Accordingly, the mobile unit's pseudo range observed values may be corrected by the differential corrections for a more precise determination of the geocentric position of the mobile unit. It should be noted that the accuracy of the corrections is somewhat dependent on the proximity of the mobile unit relative to the ground station.

Although differential GPS ground stations have advanced the art of GPS for some applications, there is a need for a differential GPS ground station with enhanced integrity, continuity, and availability as particularly identified in the aforesaid RTCA publication.

SUMMARY OF THE INVENTION

An object of the present invention is to provide a differential GPS ground station having enhanced continuity, availability of function, and integrity.

In the present invention, a plurality of GPS receivers are operative for receiving selected satellite signals and deriving from the satellite data associated with each of the received satellite signals: (i) a receiver-satellite-specific pseudo range value at a corresponding receiver-satellite-specific measurement time, where said receiver-satellite-specific pseudo range value is an estimate of the true range value between a corresponding one of said plurality of receivers and one of said plurality of satellites, and where the receiver-satellite-specific pseudo range value is related to the corresponding satellite signal travel time between a specific one of said plurality of satellites to a specific one of said plurality of receivers, and (ii) the corresponding satellite position at said receiver-satellite-specific measurement time. The ground station further including a differential correction processor which includes a signal processor for determining a receiver-satellite-specific calculated range value where said calculated range value is the range between the geocentric position of the ground station and the geocentric position of the satellite sending the received satellite signal, and a signal processor for calculating a receiver-satellite-specific difference between corresponding ones of the receiver-satellite-specific calculated range values and said receiver-satellite-specific pseudo range values, and a signal processor for deriving the satellite-specific pseudo range error associated with each received satellite signal as a function of a plurality of the receiver-satellite-specific pseudo range values associated with the same satellite.

DESCRIPTION OF THE PREFERRED EMBODIMENT

Figure 1:
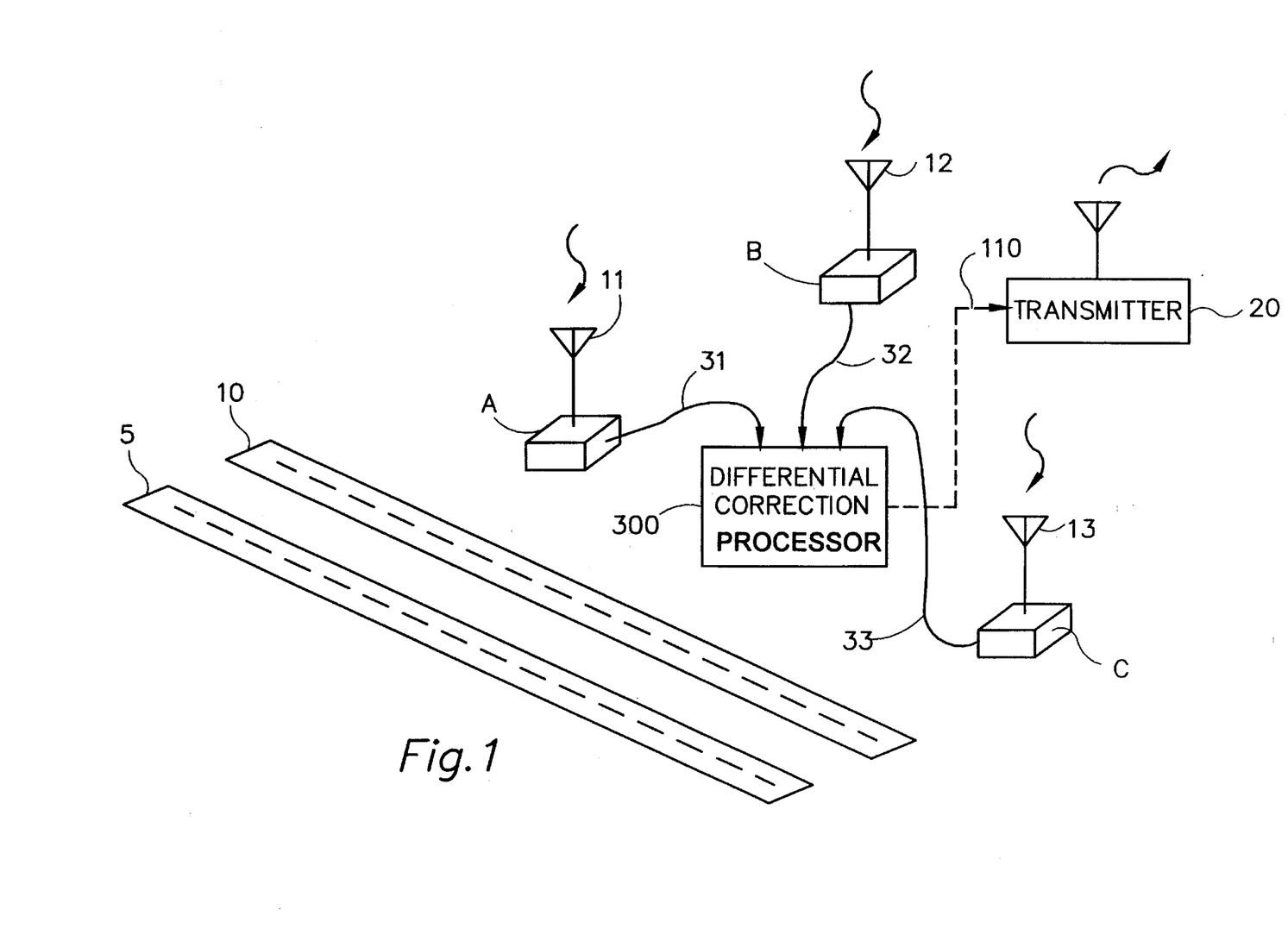
FIG. 1 is a schematic diagram of a differential for an aircraft airport landing system.

Illustrated in FIG. 1 is a schematic diagram illustrating a differential GPS ground station in accordance with the present invention for application for a precision approach landing system for an airport. Thereshown are a pair of runways 5 and 10. In close proximity to the runways are three (3) remote GPS antenna-receiver units identified as receivers A, B, and C, in which their respective antennas 11, 12, and 13 are in spaced apart arrangement, being approximately 100 meters from each other so as to separately receive GPS satellite signals and at the same time minimize any multi-path satellite signals—signal reflections from the earth's surface or earth surface objects. Further shown is a differential correction processor 300 responsive to information from the remote GPS receivers, A, B, and C for deriving satellite-specific pseudo range corrections 110 which may be transmitted to an aircraft or mobile unit by a data link transmitter 20.

Figure 2:
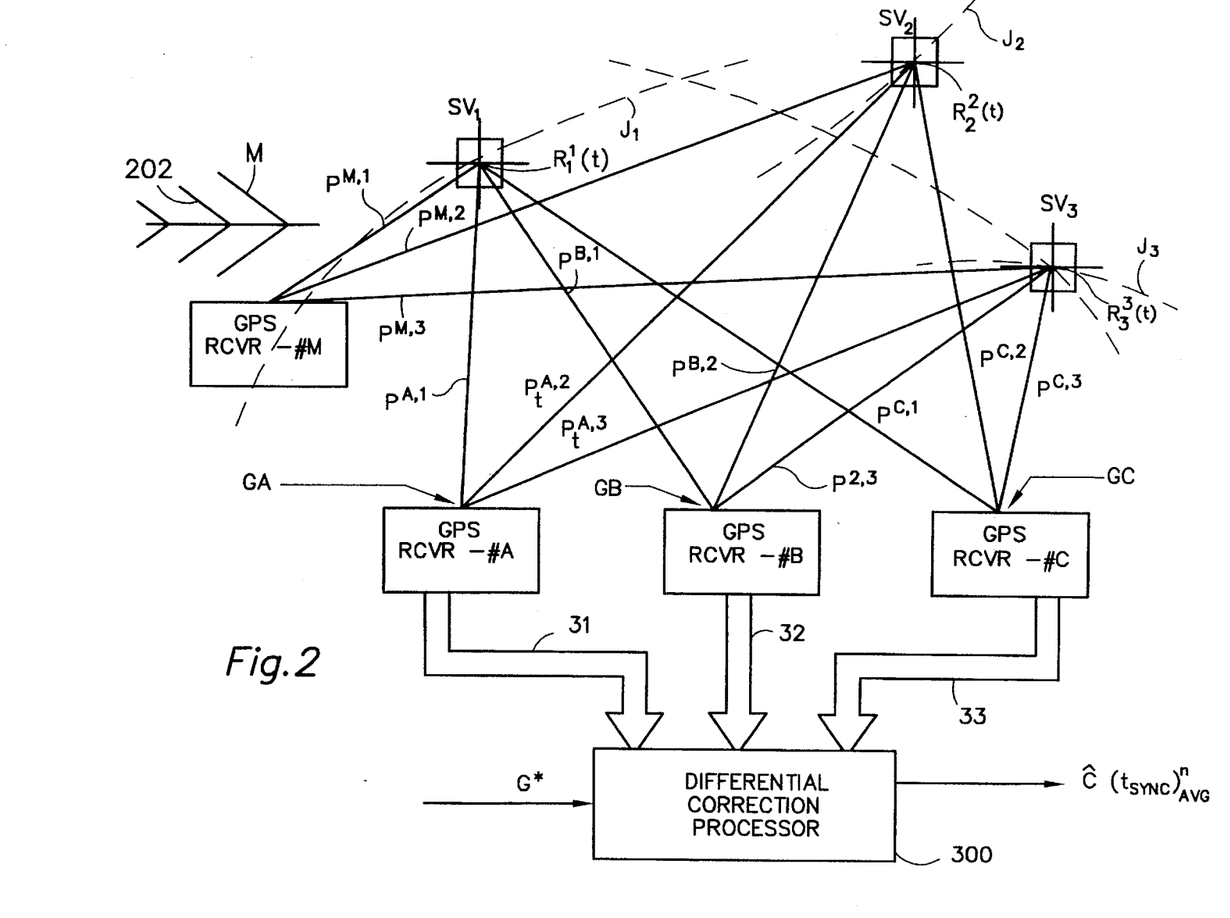
FIG. 2 is a schematic diagram illustrating pseudo ranges and components of the system of FIG. 1.

FIG. 2 is an illustration depicting the mechanics of the differential GPS system in accordance with the present invention. In the illustration of FIG. 2, three satellites are shown in order to simplify understanding of the system of the present invention, where a minimum of four are generally necessary for a GPS navigation solution, and five satellites are generally required for application of a receiver autonomous integrity monitoring system. Thereshown in FIG. 2 is a first satellite or satellite vehicle $SV_1$ which travels the orbital trajectory $J_1$ and is at a position $R^1(t)$, having coordinates x,y,z. Similarly, thereshown are satellites $SV_2$ and $SV_3$, traveling trajectories $J_2$ and $J_3$, respectively, and being at positions $R^2(t)$ and $R^3(t)$, respectively. The satellite positions are of course time related, and are therefore unique for a specific time.

Also illustrated are GPS receivers A, B, and C, designated receivers RCVR-#A, #B, #C, respectively, located at true surveyed positions GA(x,y,z), GB(x,y,z), and GC(x,y,z), respectively. Further illustrated is a mobile unit, for example an aircraft 202, having a GPS receiver designated RCVR-#M, located at a position to be determined by the GPS satellite triangulation positioning method. Although not shown, aircraft 202, or other mobile unit, includes a data-link receiver for receiving a correction message from transmitter 20 or the like. The correction message may include the pseudo range correction, herein referred to as the differential correction, as well as the associated satellite vehicle identification (SV/ID), time of correction, pseudo range correction rate. As is understood, the time of correction and the pseudo range correction rate may be employed to extrapolate from the time of correction to the time of application to the mobile unit's GPS receiver information.

Herein, it should be understood that the GPS receiver is intended to determine the geocentric position of the associated antenna. In the exposition which follows, the term "receiver" implies the position of the antenna as well as the associated electronics or signal processing components for tracking the satellite signals received by the antenna. Further, let "K" be the number of GPS ground station receivers in proximity to a particular airport runway or spatial location of interest, and let "N" be the total number of satellites tracked at a particular measurement time.

As is well understood in the art, each of the satellite vehicles separately transmits a satellite signal which contains satellite-specific data including the satellite vehicle identification number, ephemeris and course almanac data which describes the trajectory of the satellite vehicle, the time of satellite signal transmission health and status information as is well known. As is understood in the art, ephemeris data identifies the most accurate satellite vehicle trajectory information, and course almanac data provides geocentric orbital information of the entire constellation of the satellites which makes up the NAVSTAR system from which the geocentric position of any one satellite may be derived for any instant time.

Each of the GPS receivers is generally operative to provide standard information derived from the satellite signal including, among other information, satellite vehicle identification number, pseudo range, delta-pseudo range (derived from the carrier signal), satellite trajectory information, signal to noise ratio of the receiver, and the IOD (issue of data time). Thus, as illustrated in FIG. 2, GPS receivers A, B, and C each provide unique receiver-satellite-specific pseudo range information to differential correction processor 300 in a manner as is will now be described.

GPS receiver A is responsive to the satellite signal transmitted from satellite $SV_1$, and determines therefrom at least the receiver-satellite-specific pseudo range value identified as $P(t)^{A,1}$, where the superscripts "A,1" refers to the pseudo range measurement from receiver A and corresponding satellite "1", namely, $SV_1$. This may be mathematically represented by $P(t)^{k,n}$ where "k" represents the designated receiver number, and "n" represents the particular satellite and corresponding satellite signal, and more particularly the satellite signal travel time, from which the pseudo range measurement is derived. In accordance with this nomenclature, for the example illustrated in FIG. 2, ground station GPS receiver A determines pseudo range values $P(t)^{A,1}$, $P(t)^{A,2}$, and $P(t)^{A,3}$. Similarly, ground station GPS receiver B determines pseudo range values $P(t)^{B,1}$, $P(t)^{B,2}$, and $P(t)B,3$; ground station GPS receiver C determines pseudo range values $P(t)^{C,1}$, $P(t)^{C,2}$, and $P(t)^{C,3}$; and mobile unit receiver M determines pseudo range values $P(t)^{M,1}$, $P(t)^{M,2}$, and $P(t)^{M,3}$. In turn, each of the ground station receivers provides their respective receiver-satellite-specific pseudo range values to differential correction processor 300 on data signal lines 31, 32, and 33, respectively. In order to calculate the differential corrections, processor 300 further includes the ground station receiver's positions identified as $G^k$, namely GA, GB, and GC.

In the present invention, the differential correction processor 300 is operative to calculate the satellite-specific differential corrections $\hat{C}_{AVG}^n$ for each individual tracked satellite as a function of the corresponding receiver-satellite-specific pseudo range values $P^{k,n}$ for the same satellite in a manner as will now be described.

In the description of the Figures which follow, it should be understood by those skilled in the art that the block diagrams are only illustrative in nature in order to enhance understanding of the present invention. More specifically, the blocks illustrated may be combined as part of a single microprocessor or a computing device. The interconnections between the blocks shown are intended to represent data being transferred between selected components or software program blocks or modules as is well known in the art. Lastly, timing diagrams have not been shown and have been only loosely been implied in order to not obfuscate the present invention. Nevertheless, the present invention employs "feedback" and/or "stepwise" processes and the like.

Figure 3:
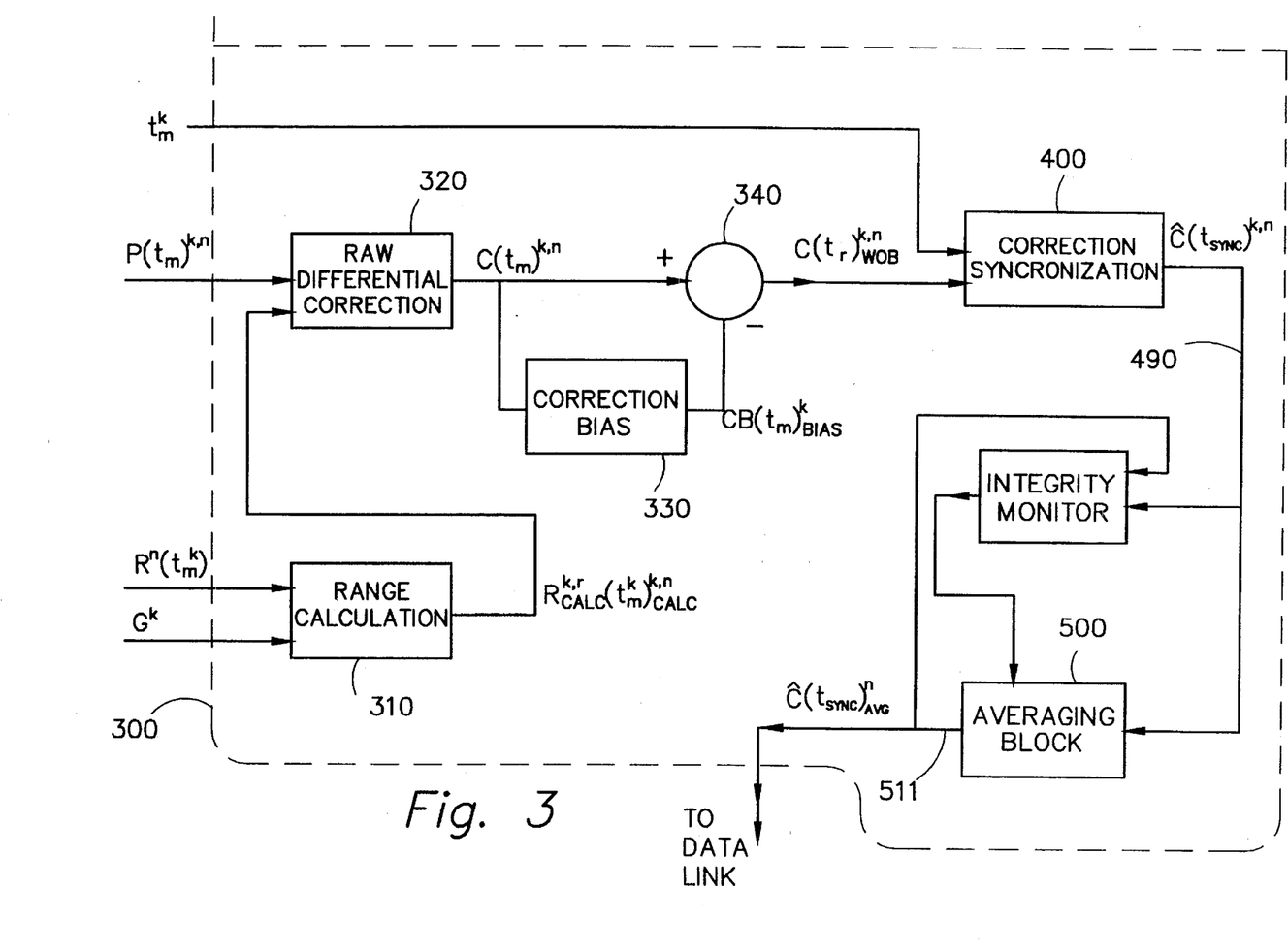
FIG. 3 is a schematic block diagram of the differential GPS system in accordance with the present invention.

Referring now to FIG. 3, thereshown is a differential correction processor 300 having as inputs the individual receiver-satellite-specific pseudo range values $P(t_m)^{k,n}$, where $t_m$ is the corresponding receiver-specific measurement time which may also be denoted $t_m^k$. Also, from each of the receivers is a corresponding satellite position value $R(t_m)^n$ corresponding to the satellite geocentric position at the pseudo range measurement time $t_m^k$.

Differential correction processor 300 includes a satellite position based range calculation block 310 which computes the receiver-satellite-specific true range value between the geocentric position of the individual receiver $G^k$ and the geocentric position of the satellite $R(t_m)^n$ at time $t_m$ for each receiver and each tracked satellite as mathematically described as:

$$r(t_m)_{calc}^{k,n} = R(t_m)^n - G^k$$

In turn, a receiver-satellite-specific differential correction $C(t_m)^{k,n}$ is calculated by raw differential correction block 320 as a function of the receiver-satellite-specific pseudo ranges $P(t_m)^{k,n}$ and the receiver-satellite-specific true range calculation $r(t_m)_{calc}^{k,n}$ as follows:

$$C(t_m)^{k,n} = P(t_m)^{k,n} - r(t_m)_{calc}^{k,n}$$

The raw differential corrections $C(t_m)^{k,n}$ includes, however, any receiver-specific clock bias. As illustrated in FIG. 3, correction bias block 330 serves to calculate the receiver specific clock bias for each of the receivers. One technique for determining receiver-specific clock bias is to first compute the average receiver-satellite-specific differential correction separately for each receiver, namely:

$$C(t_m)_{avg}^k = \frac{\sum_{n=1}^{N} C(t)^{k,n}}{N} \quad |k=1,\ldots K$$

In turn, these receiver-specific differential correction averages may be passed through a low pass filter (not shown) to arrive at a receiver-specific clock bias value $CB(t_m)_{bias}^k$ included in the raw receiver-satellite-specific differential correction values $P(t_m)^{k,n}$.

In turn, the receiver-specific bias value may be subtracted from each of the receiver-satellite-specific raw differential corrections for the same receiver in function block 340 to provide differential correction values corrected for receiver clock bias, designated $C(tm_m)_{wob}^{k,n}$, meaning receiver-satellite-specific differential corrections without clock bias.

It should be noted that receiver-satellite-specific differential corrections have associated therewith the specific receiver measurement clock time $t_m^k$ at which the receiver-satellite-specific pseudo range measurements are measured. Since there may be a difference between the receiver measurement clock times, each of the differential corrections $C(t_m)_{wob}^{k,n}$ preferably needs to be synchronized or extrapolated to a common synchronization time $t_{SYNC}$, for example the medium time of all of receiver measurement times.

Figure 4:
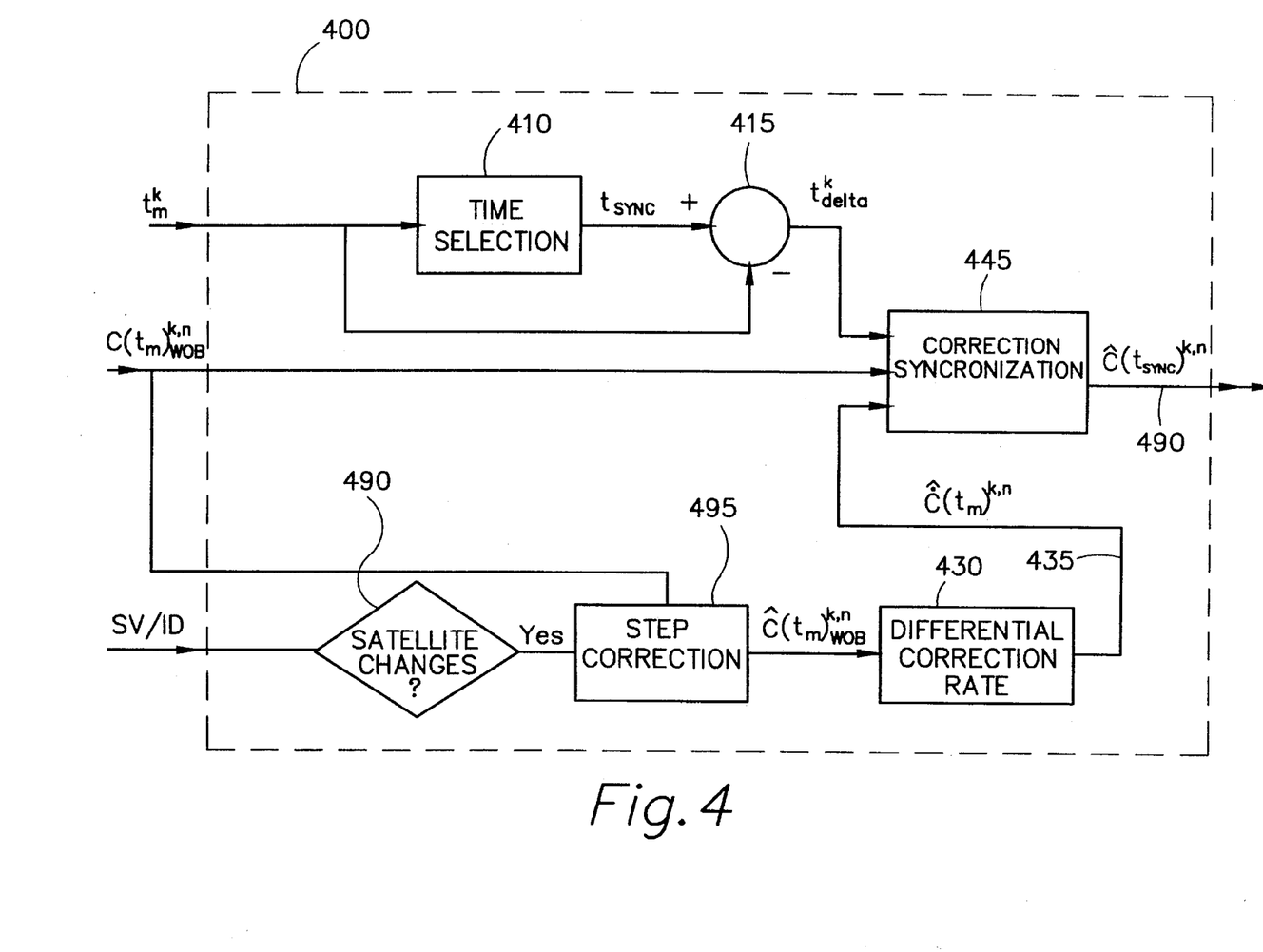
FIG. 4 is a schematic block diagram showing further details of the satellite-specific synchronizing block of FIG. 3

Illustrated in FIG. 3 is a measurement time synchronization block 400 which serves to adjust each of the receiver-satellite-specific differential corrections (without clock bias) to a common time, the details of which are illustrated in FIG. 4.

The purpose of the synchronization block 400 is to correct those values of the differential corrections $C(t_m)_{wob}^{k,n}$ for variations in the receiver measurement times. This is accomplished by first establishing a synchronization time $t_{SYNC}$, calculating the rate of change of the differential corrections, and subsequently adjusting the values of the differential corrections to be all at the singular synchronization time $t_{SYNC}$.

Referring now to FIG. 4, thereshown is time synchronization function block 400, including medium time selection block 410 responsive to the measurement times $t_m^k$ of each of the receivers. The synchronization time may be selected by a variety of schemes including those in which an average time or the medium time of all receiver measurement times is selected, and identified as the synchronized time $t_{SYNC}$. In the preferred embodiment of the invention the medium time is determined. In turn, differential block 415 calculates the time difference between the synchronization time $t_{SYNC}$ and the receiver measurement time $t_m^k$, having an output identified as $t_{delta}^k$.

In order to synchronize the differential corrections to a common time, the receiver-satellite-specific differential correction rate is calculated in block 430 and may be mathematically expressed as follows:

$$\hat{\dot{C}}(t_m)^{k,n} = \frac{\hat{C}(t_{m\_new})_{wob}^{k,n} - \hat{C}(t_{m\_old})_{wob}^{k,n}}{(t_{m\_new}) - (t_{m\_old})}$$

In turn the differential corrections, without bias, are adjusted to the synchronized time by correction synchronization block 445 which computes the desired value which may be mathematically expressed as follows:

$$\hat{C}(t_{SYNC})^{k,n} = C(t_m)_{wob}^{k,n} - \hat{\dot{C}}^{k,n} * t_{delta}$$

These values are receiver-satellite-specific differential corrections which have been adjusted to be valid for a common receiver measurement time $t_{SYNC}$ and adjusted for receiver clock bias.

It should be noted that the correction values $C(t_m)_{wob}^{k,n}$ used in the calculation of $\hat{C}(t_{SYNC})^{k,n}$ assumes a proper clock bias correction $CB(t_m)_{bias}^k$. However, this clock bias may tend to change in a stepwise fashion due changes in the tracked satellites, more particularly to an increase or decrease in the number of satellites being tracked. In turn, if the rate values are in error due to these variations in clock bias, then such errors will ripple through the synchronized differential corrections. Accordingly, it is preferable to employ a mechanization to correct for step changes in the clock bias and subsequent errors in the differential corrections $C(t_m)_{wob}^{k,n}$ upon occurrence of changes in tracked satellites. A mechanization for such correction is depicted in FIG. 4, and more specifically embodied in satellite decision block 490 and step correction block 495.

Decision block 490 is intended to monitor the plurality of the ground station receivers for detecting a change in the number of satellites, either increasing or decreasing. If there is a change, then block 495 is initiated to process the receiver-satellite-specific differential correction values without bias to correct them for those step changes in the clock bias value $CB(t_m)_{bias}^k$ caused by the change in the number of tracked satellites. For example, if the number of satellites decreases, it is preferable to recalculate the clock bias without the specific data associated with the satellites which are no longer tracked and recompute those differential corrections previously corrected with an erroneous clock bias, and such values are identified as $(\tilde{C}(t_m)_{wob}^{k,n}$. Similarly, if additional satellites are tracked, then it is preferable to first recalculate the clock bias without the additional satellite data and correct those remaining differential corrections as before, and secondly correct those differential corrections associated with the newly added satellite separately with the newly arrived at clock bias, or alternatively with linearly changing clock bias as more cycle times or measurement sample times continues. There are, of course, many variations to achieve the intended function so that the value of the differential correction rate is appropriately applied to achieve the intended synchronization or extrapolation of the differential corrections, without clock bias, to a common time.

Referring again to FIG. 3, the receiver-satellite-specific differential correction values, without bias an extrapolated to a common time, $\hat{C}(t_{SYNC})^{k,n}$, from block 400 are in turn processed by satellite-specific averaging block 500 for calculating satellite-specific differential corrections which may be mathematically expressed as follows:

$$\hat{C}(t_{SYNC})_{AVG}^n = \frac{\sum_{k=1}^{K} \hat{C}(t_{SYNC})^{k,n}}{K} \quad |n = 1, \ldots N$$

Figure 5:
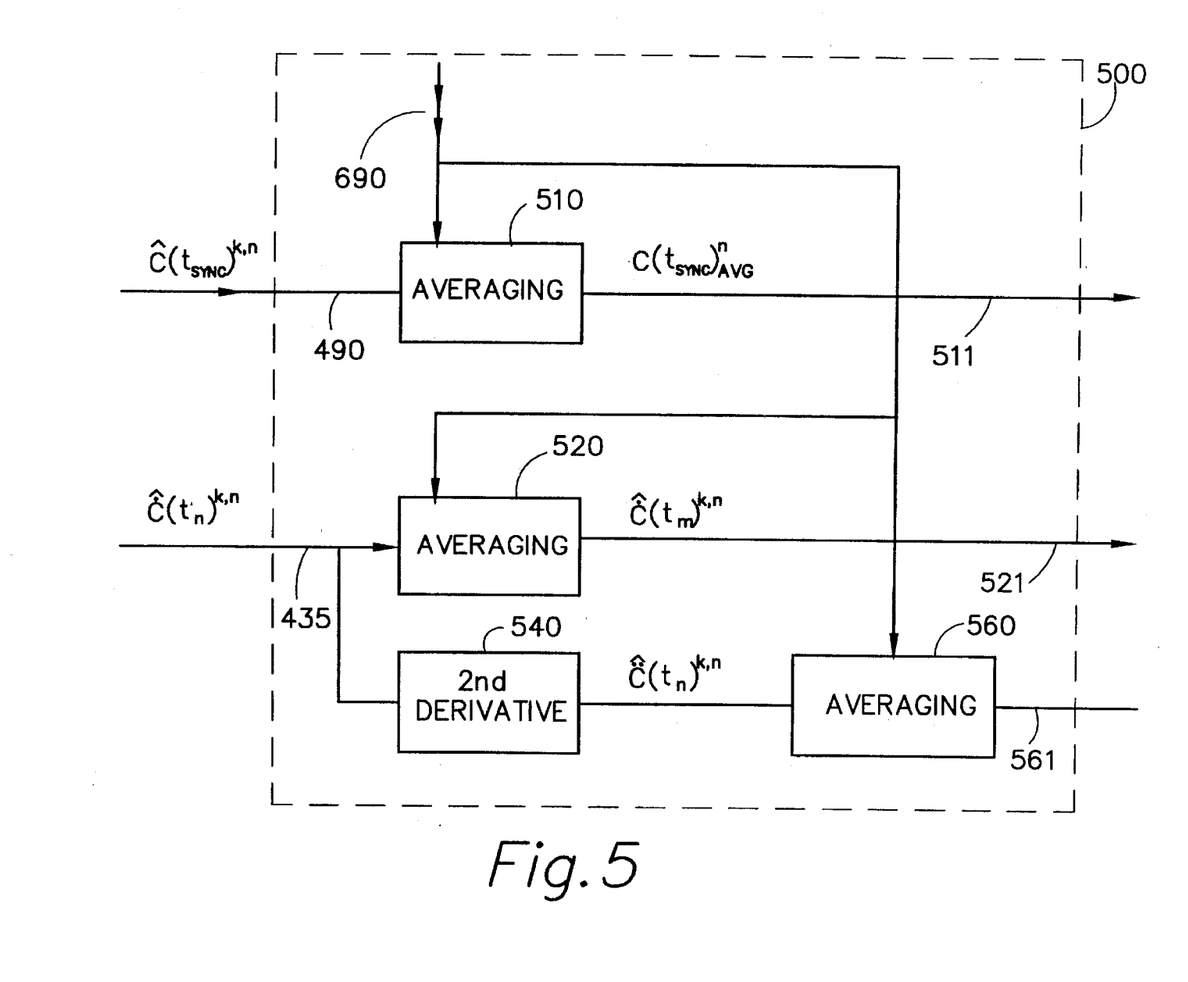
FIG. 5 is a schematic block diagram showing further details of the satellite-specific averaging block of FIG. 3.

Further details of averaging block 500 are illustrated in FIG. 5.

As illustrated in FIG. 5, satellite-specific correction averaging block 500 includes a satellite specific averaging block 510 which serves to calculate the satellite-specific differential correction values $\hat{C}(t_{SYNC})_{AVG}^n$ as a function of the individual receiver-satellite-specific corrections $\hat{C}(t_{SYNC})^{k,n}$ on data line 490. Satellite-specific averaging block 510 further includes a data select input 690 from integrity monitor 600 as will be subsequently described in further detail as particularly illustrated in FIG. 6. Block 510 is intended to compute the satellite-specific correction values and output them on data signal line 511 in a manner as aforesaid.

Also illustrated in FIG. 5 as part of satellite-specific correction averaging block 500, are function blocks for computing the satellite-specific first and second derivatives of the differential corrections. As illustrated, first derivative averaging block 520 is shown responsive to the differential correction rate values $\hat{\dot{C}}(t_m)^{k,n}$ on data signal line 435 as previously computed by correction rate function block 430 for computing the average as follows:

$$\hat{\dot{C}}(t_m)_{AVG}^n = \frac{\sum_{k=1}^{K} \hat{\dot{C}}(t_m)^{k,n}}{K} \quad |n = 1, \ldots N$$

The second derivative is determine in block 540 as follows:

$$\hat{\ddot{C}}(t_m)^{k,n} = \frac{\hat{\dot{C}}(t_{m\_new})_{wob}^{k,n} - \hat{\dot{C}}(t_{m\_old})_{wob}^{k,n}}{(t_{m\_new}) - (t_{m\_new})}$$

In turn, the rate of change of the differential correction rate values $\hat{\ddot{C}}(t_m)^{k,n}$ is averaged in function blocks 560 in the same manner as blocks 510 and 520. These values may be outputted on data lines 521 and 561 respectively.

Figure 6:
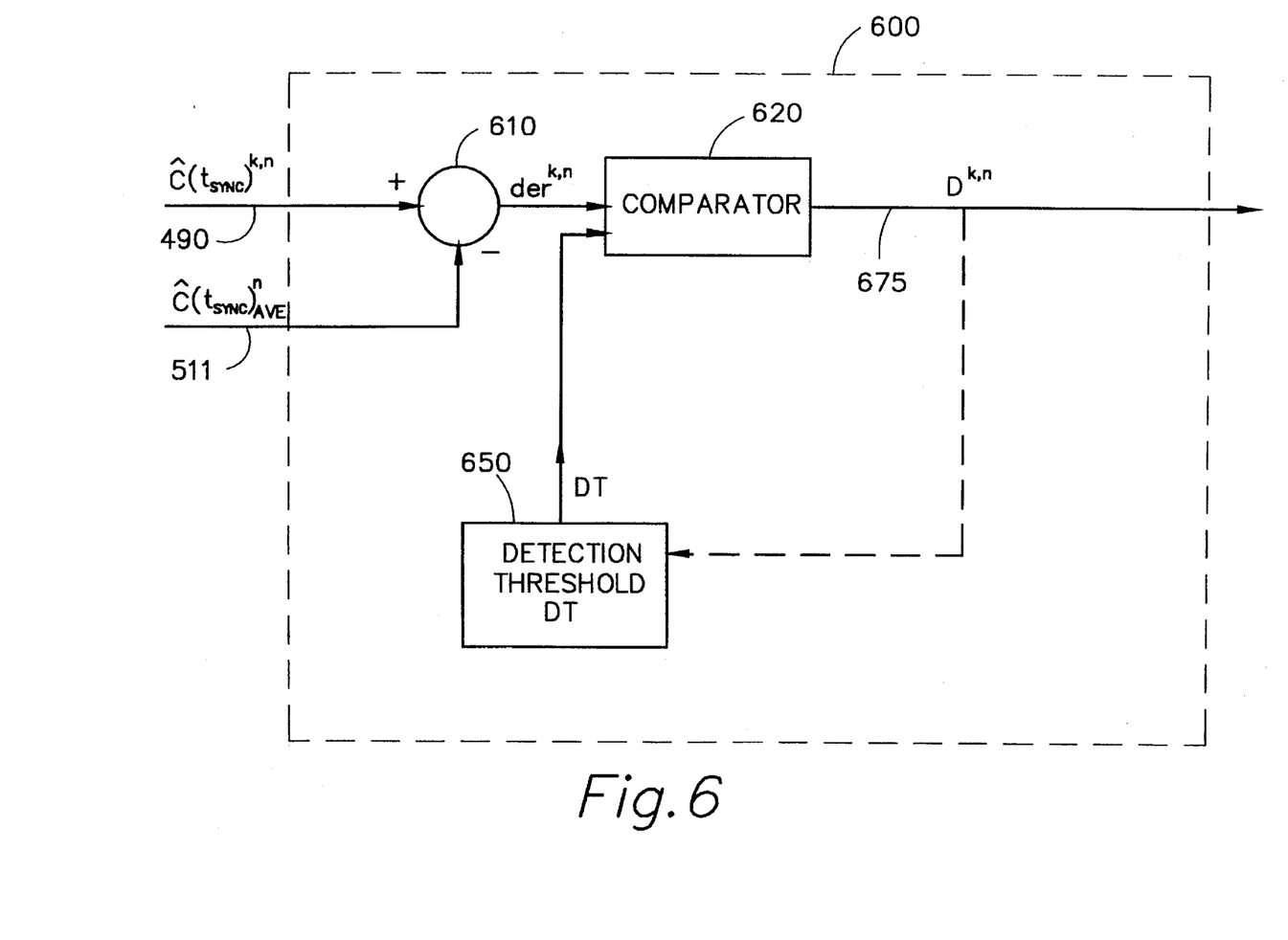
FIG. 6 is a schematic block diagram showing further details of the integrity monitor block of FIG. 3.

The differential global positioning system in accordance with present invention may further include an integrity monitor as designated by block 600 in FIG. 3, the details thereof illustrated in FIG. 6. The integrity monitoring function serves to validate use of specific satellite-specific differential correction measurements which, of course, are derived from receiver-satellite-specific pseudo range measurements or values, for enhancement of the differential GPS ground station integrity to meet the requirements of the aforesaid RTCA requirements. In particular, multi-path errors produced by the GPS receivers may be detected an eliminated as will subsequently be described.

Illustrated in FIG. 6 is one technique for implementing an integrity monitor for use with the differential GPS ground station in accordance with the present invention. As illustrated in FIG. 6, thereshown is integrity monitor 600 responsive to the satellite-specific differential correction values $\hat{C}(t_{SYNC})_{AVG}^n$ on data line 511 and also the receiver-satellite-specific correction values $\hat{C}(t_{SYNC})^{k,n}$ on data line 490. Difference function block 610 calculates the individual receiver-satellite-specific deviations as mathematically described as follows:

$$dev^{k,n} = \hat{C}(t_{SYNC})_{AVG}^n - \hat{C}(t_{SYNC})^{k,n}$$

In turn, each of the receiver-satellite-specific deviations $dev^{k,n}$ are compared in block 620 with a detection threshold value DT, the output of detection threshold function block 650.

Detection threshold function block 650 may employ a variety of error threshold schemes to enhance the integrity of the differential GPS ground station in accordance with the present invention. For example, in the most simple manner, detection threshold block 650 may simply output a constant value DT. The value DT may be determined by estimates of GPS receiver signal noise and appropriate approximations by Gaussian probability distribution functions. For example:

$$DT = 2Q^{-1}(P_{pfd}/2)$$

where, $$P_{pfd} = 2Q(DT/\sigma_d) = 2 \frac{2}{\sqrt{2\pi}} \int e^{\frac{t^2}{2}} dt$$

which relates the noise error is the discriminator, namely each of the respective receivers.

As noted in FIG. 6, comparator 620 compares the deviation values $dev^{k,n}$ with the threshold detection value DT. If the value $dev^{k,n}$ is greater than DT, comparator 620 provides as an output $D^{k,n}$ on data line 675 which represents the particular satellite-receiver-pair "k,n" having a corresponding differential correction value $C(t_m)^{k,n}$ which has been found to be faulty, or more specifically, failed the integrity monitor detection threshold test. Having knowledge of which receiver-satellite-specific measurement is potentially in error, for example, due to random signal noise, allows for the differential computations to be re-evaluated without including the discrete values which fail the threshold detection test.

The employment of the integrity monitoring function of block 600 is particularly illustrated in FIG. 5. Thereshown is data lines 690 presented to each of the averaging blocks 510, 520, and 540. These averaging blocks are so configured so as to be responsive to the $D^{k,n}$ data for appropriate elimination of the specific receiver-satellite values, "k,n", which form the averages, and permits the subsequent averaging calculations without the faulty ones and thereby enhance the integrity of the satellite specific differential corrections, and rate values on data lines 511, 521, and 541. In this manner, the determination of the satellite-specific correction values have enhanced performance since they are continuously responsive to the dynamics of the GPS system with respect to the receivers for tracking specific satellites at any particular moment.

As illustrated in FIG. 6, the detection threshold block may be responsive to the values of $D^{k,n}$ for refining the detection threshold value DT—that is, for example, the signal noise values of the those receivers may be a direct function of the value of DT, and faulty receiver-satellite-specific values may be eliminated in the aforedescribed calculations.

In should be noted that the averaging disclosed herein may be altered and such embodiments are intended to be within the true spirit and scope of the present invention. For example, averaging blocks 510, 520, and 560 may be implemented by a wide variety of filtering techniques, for example a Karma filter using a random acceleration third order state model. The filter design parameter (process and measurement noise variances) may be chosen to filter receiver noise without jeopardizing the ability of the filter to track variations due to selective availability (SA) errors.

Although not shown in the Figures, employment of data smoothing techniques is also within the scope of the present invention. Smoothing techniques are well known and may be of the variety illustrated in the above referred to publication which employs use of the high frequency values of delta pseudo ranges as commonly derived by the GPS receiver from the satellite signals.

In summary, the differential global positioning system in accordance with the present invention has employed a plurality of GPS receivers, preferably three for fail-operative mode, to obtain independent receiver-satellite-specific differential corrections. Namely, a set of differential correction values for each satellite derive by each receiver. Each of differential correction sets, one for each receiver, is formed as follows: range calculations are determined using the surveyed positions of each of the receivers antennas and the receiver's output of the satellite vehicle's position or trajectory information. Raw differential correction values are then determines as the difference between the calculated range value and the appropriate pseudo range values determined by the GPS receiver. From these raw differential correction values are subtracted and estimate of the clock bias error contain therein by subtracting a heavily filtered value of the receiver-specific average of all of the receiver-specific pseudo range values for the tracked satellites. In turn, these values are processed by a selected averaging or filtering scheme to determine satellite-specific differential corrections, and/or differential correction rates which in turn may be transmitted to a remote mobile unit, such as an aircraft in a well known manner.

The differential global positioning system in accordance with the present invention further includes integrity monitoring for determining those receiver-satellite-specific values which may be erroneous or faulty. This may be accomplished by application of deviation test relative to a selected detection threshold value. This test may be applied generally to each receiver-satellite-specific differential correction value by examining the deviation between the receiver-satellite-specific differential correction value and the mean of the satellite-specific differential correction values. A failure of the test results in certain receiver-satellite-specific differential correction values to be discounted or eliminated, and subsequent recomputing of the averages. It is this resultant average that may be transmitted to the mobile unit's GPS receiver for differential correction of the pseudo ranges determined therefrom.

As is well understood in the art, a single electronic/software subsystem may be employed for performing the appropriate calculations and generation of the satellite-specific differential corrections and integrity monitoring function is intended to be within the true spirit and scope of the present invention.

Lastly, although the present invention is intended to be operative with the NAVSTAR GPS system, other positioning systems are also within the true spirit and scope of the present invention. More specifically, any such satellite system by which geocentric position information is derived from satellite information signals is intended to be within the true spirit and scope of the present invention.

We claim:

1. A DGPS for use with a plurality of satellites each transmitting information including satellite position (R) and the time of transmission;

a plurality of receivers whose positions (G) are known, the receivers operable to produce pseudo range values (P) indicative of the distance between receiver and satellite based on the transit time of the signal from satellite to the receiver;

range calculation means operable to produce calculated range values (Racal) from the difference between G and R;

differential correction means receiving the Racal and P values to produce differential correction values (C);

averaging means connected to receive the differential correction values and to produce average differential correction values (Cave); and integrity monitoring means connected to receive only C and Cave and to produce a fault signal if the difference therebetween exceeds a threshold value.

2. A differential satellite positioning system ground station operative for determining a satellite-specific pseudo range error associated with each received satellite information signal transmitted from selected ones of a plurality of satellites, where "n" represents a specific one of said plurality of satellites, said differential satellite positioning system ground station comprising:

a plurality of GPS receivers, where "K" represents the total number of said plurality GPS receivers and where "k" represents a specific one of said "K" GPS receivers and wherein each one of said plurality of GPS receivers, (i) is independent of each other, (ii) is operative for receiving a satellite information signal from each of selected ones said plurality of satellites, (iii) has a known geocentric position, identified as $G^k$, and (iv) is in spatial proximity to a spatial location of special interest, (v) is operative for deriving from satellite data associated with each received satellite information signal at least a geocentric satellite position, identified as $R(t_m)^n$, at a receiver-specific measurement time, identified as $t_m$, of the specific satellite, "n", transmitting the satellite information signal, and (vi) is operative for deriving from satellite data associated with each received satellite information signal at least a satellite-receiver-specific pseudo range value identified as $P(t_m)^{k,n}$ where k and n represent said specific GPS receiver and satellite, respectively, and $t_m$ corresponds to said receiver-specific measurement time, and where said satellite-receiver-specific pseudo range value is an estimate of the true range value between a specific GPS receiver, "k", and a specific satellite, "n", derived from said satellite information signal and related to the corresponding satellite signal travel time from the specific satellite to the specific GPS receiver; and a differential correction processor including, means for determining receiver-satellite-specific calculated range values, identified as $r(t_m)_{calc}^{k,n}$, where each receiver-satellite-specific calculated range value is the difference between (i) corresponding "k" and "n" ones of said geocentric receiver position $G^k$ of a specific GPS receiver, "k" and (ii) said satellite position $R(t_m)^n$ of a specific satellite, "n" at a corresponding receiver-specific measurement time, $t_m$, means for calculating corresponding receiver-satellite-specific difference values, identified as $C(t_m)^{k,n}$, each being the difference between (i) corresponding "k" and "n" ones of said receiver-satellite-specific calculated image values, $r(t_m)_{calc}^{k,n}$, and (ii) said satellite-receiver-specific pseudo range values, $P(t_m)^{k,n}$, means for deriving said satellite-specific pseudo range error associated with said satellite information signal transmitted from each of said selected plurality of satellites as an average of said receiver-satellite-specific difference values, $C(t_m)^{k,n}$ derived by selected ones of said "K" GPS receivers for each of said selected ones of said satellite information signals; and integrity monitoring means comparing the difference between the receiver-satellite specific difference values with the average of said receiver satellite-specific difference values and producing a fault signal if the difference is greater than a predetermined threshold value.

3. The differential satellite positioning system ground station of claim 2 further comprising an integrity monitoring system including:

means for computing first receiver-satellite specific discriminate values as the difference between corresponding ones of said satellite-specific pseudo range error values and said receiver-satellite specific difference values; and means for computing second receiver-satellite specific discriminate values as the difference between corresponding ones of said first receiver-satellite specific discriminate values and said detection threshold.

4. The differential satellite positioning system ground station of claim 2 further including means for removing receiver-specific clock bias from each of said receiver-satellite-specific difference values, and said satellite-specific pseudo range error values are computed as an average of those receiver-satellite-specific difference values with clock bias removed.

5. The differential satellite positioning system ground station of claim 3 further including means for synchronizing each of said receiver-satellite-specific difference values to a common synchronization time, and said satellite-specific pseudo range error values are computed as an average of those synchronized receiver-satellite-specific difference values synchronized to said common synchronization time.

6. The differential satellite positioning system ground station of claim 3 further including means for removing receiver-specific clock bias from each of said receiver-satellite-specific difference values; and means for synchronizing each of said receiver-satellite-specific difference values to a common synchronization time, and said satellite-specific pseudo range error values are computed as an average of those synchronized receiver-satellite-specific difference values synchronized to said common synchronization time with clock bias removed.

7. The differential satellite positioning system ground station of claim 2 wherein said plurality of GPS receivers are sufficiently separated from each other to avoid receiving an identical multipath satellite information signal from the same satellite as received by another one of said plurality of GPS receivers.

8. A differential satellite positioning system ground station operative for determining a satellite-specific pseudo range error associated with each received satellite information signal transmitted from at least first and second satellites each transmitting a signal indicative of its position, said differential satellite positioning system ground station comprising:

a first receiver for receiving the signal from the first and second satellites and to calculate first and second true ranges, one for each of the distances between the first receiver and the first and second satellites, respectively, and to calculate first and second pseudo ranges, one for each of the distances between the first receiver and the first and second satellites, respectively, said first receiver calculating a first error signal representing the difference between the first true range and the first pseudo range, and a second error signal representing the differences between the second true range and the second pseudo range;

a second receiver located proximate the first receiver to receive the signals from the first and second satellites, and to calculate third and fourth true ranges, one for each of the distances between the second receiver and the first and second satellites, respectively, and to calculate third and fourth pseudo ranges, one for each of the distances between the second receiver and the first and second satellites, respectively, said second receiver calculating a third error signal representing the difference between the third true range and the third pseudo range, and a fourth error signal representing the differences between the fourth true range and the fourth pseudo range;

means for computing a first average being the average of said first and third error signals and for computing a second average being the average of the second and fourth error signals and integrity monitoring means comparing the differences between the first and third error signals and the average of said first and third error signals and comparing the difference between the second and fourth error signals and the average of the second and fourth error signals and producing a fault signal if the differences exceed a predetermined threshold value.

9. The differential satellite positioning system ground station of claim 8 further comprising means for communicating said first and second averages to a remote user.

10. A differential satellite positioning system ground station operative for determining a satellite-specific pseudo range error associated with each received satellite signal transmitted from a plurality of satellites, the ground station comprising:

a plurality of GPS receivers operative for receiving selected satellite signals and deriving from the satellite data associated with each of said received satellite signals at least I) a satellite-receiver-specific pseudo range value at a corresponding receiver-specific measurement time, were said satellite-receiver-specific pseudo range value is an estimate of the true range value between a corresponding one of said plurality of receivers and one of said plurality of satellites derived from said satellite signal and related to the corresponding satellite signal travel time from the specific satellite of said plurality of satellites to the specific receiver of said plurality of receivers, and ii) the corresponding satellite-receiver-specific position of said one satellite at said satellite-receiver-specific measurement time; and a differential correction processor including,
means for determining a receiver-satellite-specific calculated range for each receiver and each of said selected satellites, where said calculated range is the range between corresponding ones of the geocentric position of each of said plurality of receivers and the satellite-receiver-specific geocentric position of each of said satellites,
means for calculating a receiver-satellite-specific difference between corresponding ones of said receiver-satellite-specific calculated ranges and said satellite-receiver-specific pseudo range values, and
means for deriving said satellite-specific pseudo range error associated with said satellite signal transmitted from each of said selected plurality of satellites as a function of a plurality of said satellite-receiver-specific pseudo range values from said plurality of GPS receivers and associated with a specific one satellite,
means comparing the satellite-specific pseudo range error with the average of all of the satellite-specific pseudo range errors to produce individual receiver-satellite specific deviations; and
integrity monitoring means comprising means for comparing the satellite-specific deviations with a predetermined threshold value and producing a fault signal whenever a satellite-specific deviation exceeds the predetermined threshold value.

\* \* \* \* \*